May 9, 1967  H. KRABBERÖD  3,318,297
ARRANGEMENT IN V-TYPE COMBUSTION ENGINES
Filed Feb. 14, 1966
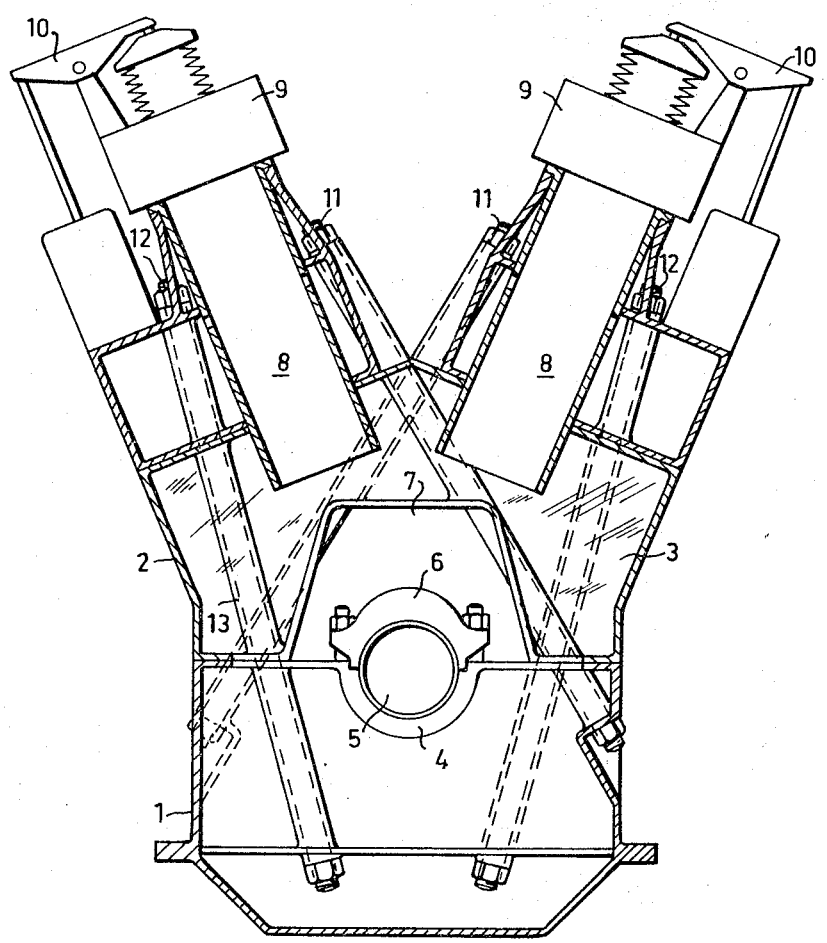
INVENTOR.
Halvard Krabberöd
BY
Pierce Scheffler & Parker
attorneys

United States Patent Office 3,318,297
Patented May 9, 1967

---

3,318,297
ARRANGEMENT IN V-TYPE COMBUSTION ENGINES
Halvard Krabberöd, Goteborg, Sweden, assignor to Aktiebolaget Gotaverken, Goteborg, Sweden
Filed Feb. 14, 1966, Ser. No. 527,012
2 Claims. (Cl. 123—195)

ABSTRACT OF THE DISCLOSURE

A V-type combustion engine comprising at least one pair of cylinders the axes of which make an angle with each other and having stay bolts on either side of each cylinder for transmitting the combustion pressure from the cylinder to the bearing frame, said stay bolts being disposed each at an angle to the axis of said cylinder such that the vertex of said angle points toward the cylinder head.

---

This invention relates to an arrangement in large V-type combustion engines, such as marine diesel engines, in which stay bolts are provided between the cylinders and the engine frame for taking the high combustion pressures. In view of the high loads occurring in such large engines it is necessary to place the crankshaft bearings such that the caps of the bearings are located on the upper side of the bearings and for removal have to be lifted by means of mechanical lifting means. In order to make this possible there is required a sufficient space above the bearings, and the object of the invention is to provide such a space which permits mounting and removal of the bearings and the crankshaft. Especially in V-type engines the available space is likely to be limited by the above named stay bolts which in such engines cross each other above the bearings. The invention is characterized in that the stay bolts on either side of each cylinder are disposed each at an angle to the axis of the cylinder with the vertex of the angle pointing toward the cylinder head.

The invention is described more closely with reference to the annexed drawing which diagrammatically illustrates a cross-sectional view of a V-type engine according to the invention.

The engine is mounted on a bearing frame 1 secured to cylinder frames 2 each of which comprises two cylinders forming a V. The frames 2 are mounted on and secured to the frame 1. Each pair of cylinders forms a unitary block having end walls 3. Provided in the bearing frame between the pairs of cylinders are bearings 4 for the crankshaft 5. Each bearing cap 6 is mounted on the upper side of the bearing. The end wall 3 has an opening 7 which is large enough to permit the cap 6 on assembling and disassembling to be readily introduced into and taken out of the crank casing. In a conventional manner the engine is provided with cylinder liners 8 exchangeably inserted in the cylinder blocks, with the cylinder heads 9 which by means of, for instance, bolts are secured to the frame 2, and with a valve mechanism 10. The combustion pressure acting in the cylinder is relieved and transmitted to the bearing frame 1 by means of stay bolts 11, 12 which extend to the underside of the bearing frame 1 and may pass through tubes 13 or similar reinforcing members in the cylinder frame 2. Preferably each cylinder has four stay bolts 11, 11 and 12, 12 disposed in two rows parallel to the crankshaft, two bolts 11, 11 being located between the cylinders in each block 2 and the other two bolts 12, 12 being located on the outside of the cylinder. The first-named bolts 11, 11 pass over the crankshaft bearing and cross the corresponding bolts 11, 11 of the opposite cylinder such that the space through the opening 7 is sufficiently great to permit lifting of the bearing cap 6. To this end the angle between each bolt 11 and the axis of the cylinder 8 is so great that the passage through the opening 7 is not, or only slightly, obstructed. As a result additional reinforcing means are not required for withstanding the component of force acting longitudinally of the cylinder. For reasons of symmetry the angle between the bolts 12 and the cylinder 8 is equal to the angle between the bolts 11 and the cylinder.

Due to the arrangement described the cylinder frame and the bearing frame can be constructed in a very simple manner. Previously, the stay bolts in similar V-type engines have been placed parallel to the axis of the cylinder and it was necessary to anchor the stay bolts in the cylinder blocks above the crankshaft with the result that the block must be able to take the stresses caused by the combustion pressure. Consequently, an unnecessarily strong structure was required. In contrast thereto the combustion pressure in an engine according to the invention is directly transmitted from the cylinder to the bearing frame due to the fact that the stay bolts extend through the cylinder frame and past the crankshaft bearings to the bearing frame to the underside of which they are preferably anchored.

What I claim is:
1. A V-type combustion engine comprising at least one pair of cylinders the axes of which make an angle with each other; cylinder heads; a cylinder frame; a crankshaft; a crankshaft bearing having an upwardly facing bearing cap; a bearing frame; and stay bolts on either side of each cylinder for transmitting the combustion pressure from the cylinder to said bearing frame; said stay bolts extending from said cylinder through the cylinder frame and past the crankshaft bearing to said bearing frame, and being disposed each at an angle to the axis of said cylinder such that the vertex of said angle is pointing toward the cylinder head.

2. A V-type combustion engine as set forth in claim 1 wherein the angle between each stay bolt and the axis of said cylinder is sufficiently great to provide a free space between the stay bolts having dimensions substantially larger than those of said bearing cap, for ready removal of said bearing cap.

References Cited by the Examiner

UNITED STATES PATENTS

| | | | |
|---|---|---|---|
| 1,295,486 | 2/1919 | Hall | 123—195 |
| 1,522,326 | 1/1925 | Reineke | 123—195 |
| 2,041,979 | 5/1936 | Thege | 123—55 |
| 2,851,020 | 9/1958 | Dolza | 123—195 X |

MARK NEWMAN, *Primary Examiner.*

W. E. BURNS, *Assistant Examiner.*